Nov. 17, 1931. L. A. ELMER 1,832,285
MECHANICAL COUPLING
Filed May 4, 1929
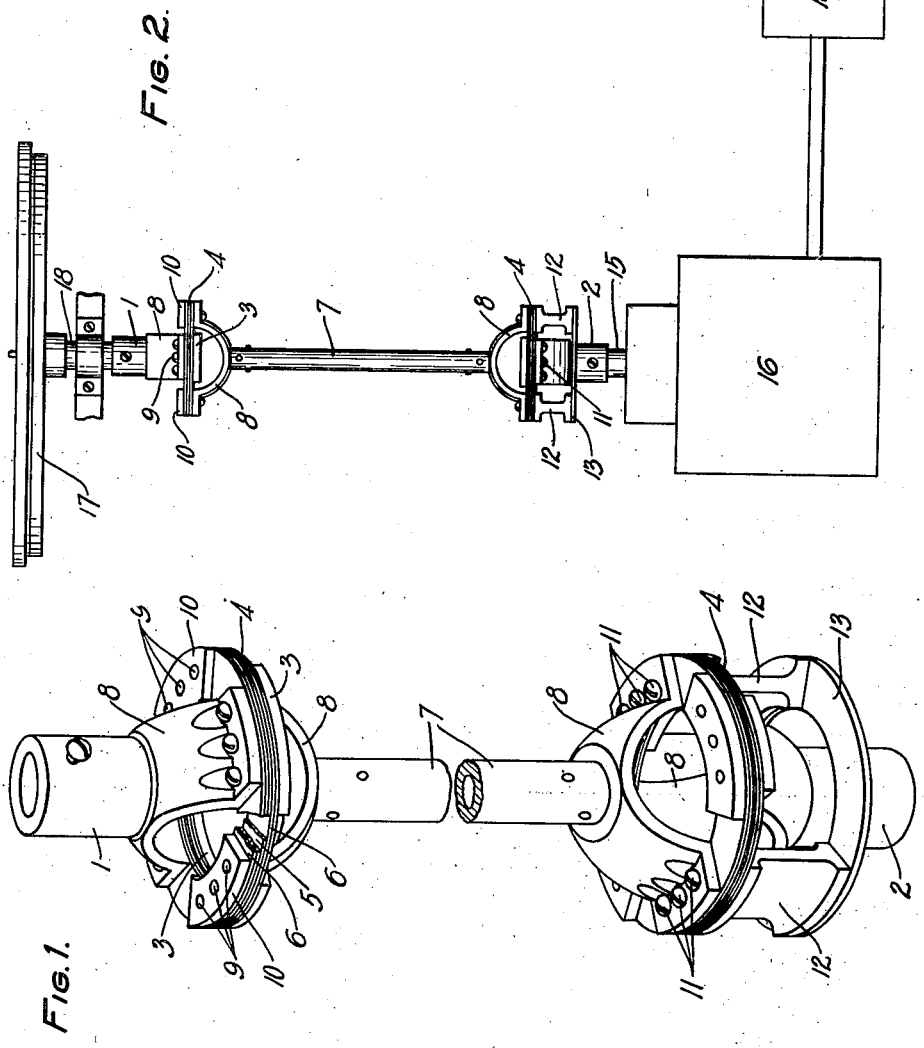
INVENTOR
L. A. ELMER
BY
ATTORNEY Patented Nov. 17, 1931

1,832,285

UNITED STATES PATENT OFFICE

LLOYD A. ELMER, OF MONTCLAIR, NEW JERSEY, ASSIGNOR TO BELL TELEPHONE LABORATORIES, INCORPORATED, OF NEW YORK, N. Y., A CORPORATION OF NEW YORK

MECHANICAL COUPLING

Application filed May 4, 1929. Serial No. 360,385.

This invention relates to drive couplings suitable for connecting the moving parts of mechanical power transmission systems and the object of the invention is to provide a coupling of this kind, by means of which a member may be driven at constant angular velocity without being subject to the extraneous vibrations of the driving system.

While the invention will be described with reference to its application to a recording machine used in the production of phonograph records, it will be obvious that it also may be used with various other machines or systems where back lash or looseness in the coupling and transmitted vibrations are objectionable. The general features of a recording machine of a type to which the coupling of this invention is applicable are shown and described in U. S. Patent 1,711,650 to Harry Pfannenstiehl.

It has been found that a turntable mounted directly on the motor shaft as shown in this patent is subject to excessive vibration and consequently later models have been built with the shaft of the driving motor mounted in a horizontal position and coupled to the turntable through worm gearing and a special damping unit for eliminating torsional vibration. The details of this unit need not be discussed in this connection since they have no direct bearing on the present invention. In machines of this later type a flexible coupling capable of functioning satisfactorily even when the shafts have both parallel and angular misalignment is necessary between the turntable and the worm gearing to prevent gear and bearing noises from impairing the record. Accordingly various well known types of coupling such as discs of flexible fabric have been tried. These expedients to a great extent nullified the goods effect of the damping unit since when made sufficiently flexible to eliminate the gear noises, they permit too great deviation from the true angular velocity required.

According to the present invention, a coupling having a very high degree of torsional rigidity and yet very little tendency to transmit gear noises is obtained by providing at each of its ends a section of high torsional rigidity and low longitudinal stiffness and so proportioning its several parts that its center of percussion is at one of the sections and its axis of suspension is at the other.

In the drawings, Fig. 1 is a perspective view of a coupling according to this invention, and Fig. 2 is an assembly view showing sufficient parts of the recording machine to make clear how the coupling device is employed in a recording system.

Referring to Fig. 1, 1 and 2 are yoke members having shanks suitably drilled to receive the vertical driving shaft 15 and the turntable shaft 18 respectively and provided with tapped clamping blocks 3—3 for connecting them with the annular torisional members 4—4, each of which consists of a spring steel ring 5 a few thousandths of an inch in thickness cemented between two or more similar rings of rubberized fabric 6—6 which prevent the metal ring from buckling at the clamping blocks. The connecting member 7 is preferably a tube of aluminum of sufficient thickness to be rigid when in operation and secured at either end to a cast metal yoke 8 which is in turn rigidly clamped to the corresponding torsional member 6 by means of set screws 9—9 and clamping blocks 10—10 and screws 11—11 and members 12—12, respectively. The members 12—12 serve also as supports for the metal balancing ring 13 which is proportioned to counteract the tendency of the worm gear thrust to rotate the coupling about a horizontal axis as more fully explained below.

Considering now the assembly of Fig. 2, the driving motor 14 supplies motive power to the vertical shaft 15 through worm gearing in the damping unit 16 which is especially designed to eliminate static friction and torsional vibration from the vertical shaft. This device, however, is not adapted to suppress any vibration due to a horizontal vibrating force applied to the gearing such as that caused by slight inaccuracies in the alignment of the beginning and ending of the worm thread so that such a force will tend to rotate the coupling about some horizontal axis in its upper portion. Since the upper steel ring is rigid in a horizontal direction, this vibration will appear at the turntable 17 and will be of an intensity determined by the magnitude of the vibrating force and the location of its axis of rotation.

It is well known in mechanics that if a force is applied in a horizontal direction to a suspended body at its center of percussion, there will be no horizontal reaction at the point of support. This principle is applied to the present design by making the metal ring 13 and its supporting members 12—12 of such mass that the center of percussion of the coupling (exclusive of the connecting yoke members 1 and 2) is at the lower metal ring 5 where the vibrating force is applied and the horizontal axis about which the system tends to rotate is at the upper metal ring 5. Accordingly the vibrating force has no horizontal component at the upper ring and hence is not transmitted to the turntable.

While a suitable mass for the balancing members may be obtained experimentally, it would be extremely difficult, due to errors of observation, to obtain the best value in this way. A mathematical solution may be obtained by assuming that the center of percussion and the axis of rotation are at the lower and upper metal rings respectively as desired and setting up an equation involving the length of the center portion of the coupling, the moment of inertia of the center portion including the balancing ring, the mass of the center portion and the weight moment about the assumed axis of rotation and solving this equation for the proper mass for the balancing ring.

It should be noted that since the vertical shaft is rotated with respect to the horizontal vibrating force, a ring member is most effective in balancing this force in all positions. The supporting members should therefore be of aluminum or other light metal and as much of the balancing weight as possible concentrated in the ring. For similar reasons every horizontal cross section of the coupling should be as nearly circular as possible.

What is claimed is:

1. A coupling device for power transmission systems comprising a rigid center member and end members having sections of high torsional rigidity and low longitudinal stiffness, the members being so proportioned that the center of percussion of the device is in the plane of one of the sections of high torsional rigidity and the axis of suspension is in the plane of the other.

2. In a power transmission system, a driving member including worm gearing, a driven member, and a coupling device connecting the members, the device having a rigid center portion and end sections of high torsional rigidity and low longitudinal stiffness, the weight of the several members being so proportioned that the center of percussion of the coupling device lies in the plane of one of the sections of high torsional rigidity, and the axis, at right angles to the axis of normal rotation about which the coupling tends to rotate due to vibrations arising in the worm gearing, lies in the plane of the other end section.

3. A coupling device for power transmission systems comprising a central rigid member terminating in yokes, annular members of high torsional rigidity and low longitudinal stiffness attached to the yokes, driving and driven members secured to the annular members at points intermediate the attachment points of the yokes and a counterweight attached to one of the annular members on the side opposite the yoke.

4. A coupling device for power transmission systems comprising a rigid center member, end members having sections of high torsional rigidity and low longitudinal stiffness and a counterweighting ring secured to one of the end members on the side opposite the center member.

5. A coupling device for power transmission systems comprising a rigid center member of light weight material, end members including thin metal sections and a counterweight of circular section with respect to the axis of the coupling device secured to one of the metal sections on the side opposite the center member.

In witness whereof, I hereunto subscribe my name this 3rd day of May, 1929.

LLOYD A. ELMER.